Dec. 21, 1954  W. B. WESTCOTT, JR  2,697,569
DETACHABLE FUSELAGE AIRCRAFT
Filed Jan. 17, 1952  3 Sheets-Sheet 1

William B. Westcott, Jr.
INVENTOR.

BY *[signature]*

HIS PATENT ATTORNEY.

Dec. 21, 1954   W. B. WESTCOTT, JR   2,697,569
DETACHABLE FUSELAGE AIRCRAFT
Filed Jan. 17, 1952   3 Sheets-Sheet 2
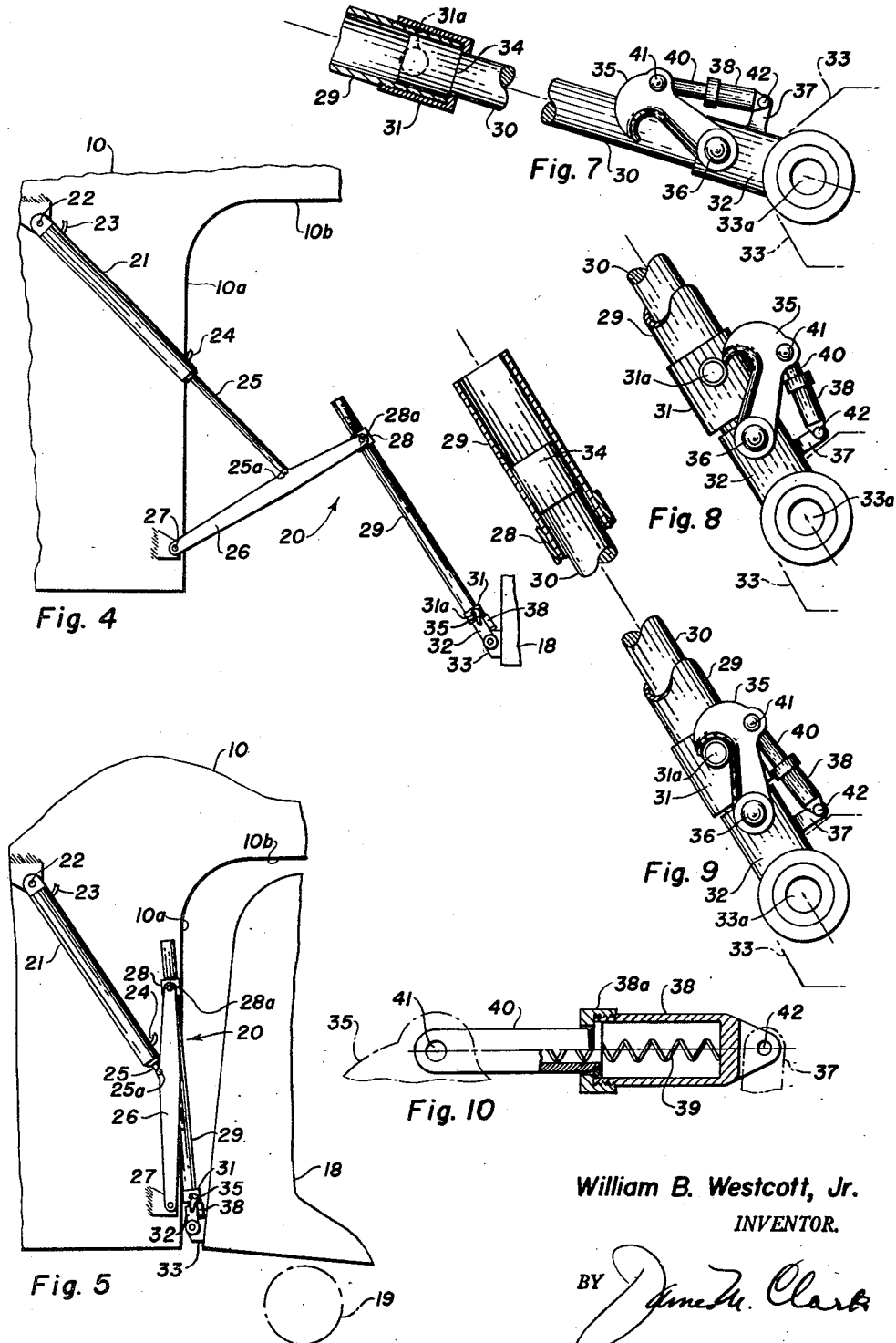
William B. Westcott, Jr.
INVENTOR.
BY *James M. Clark*
HIS PATENT ATTORNEY.

Dec. 21, 1954  W. B. WESTCOTT, JR  2,697,569
DETACHABLE FUSELAGE AIRCRAFT
Filed Jan. 17, 1952  3 Sheets-Sheet 3
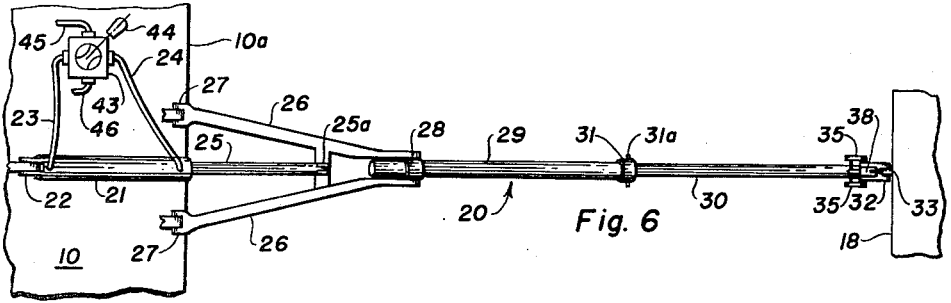
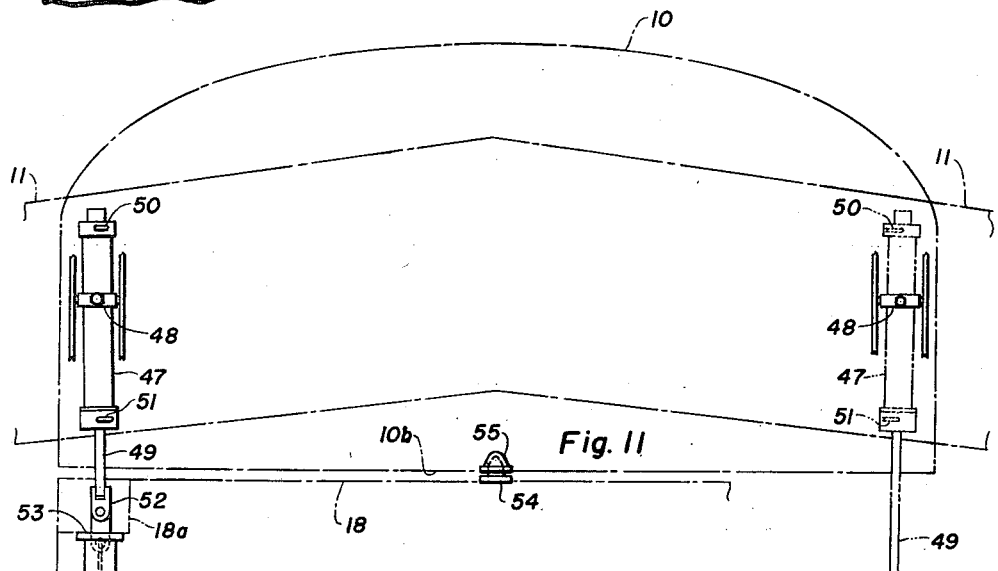
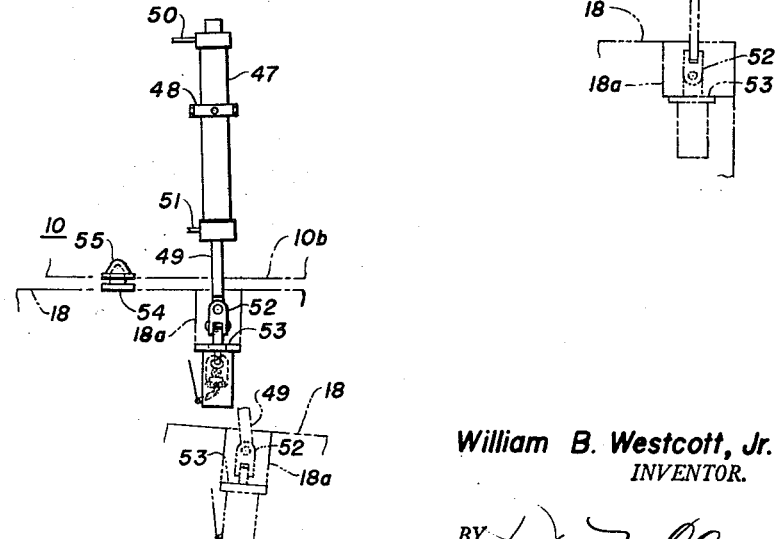
William B. Westcott, Jr.
INVENTOR.
BY
HIS PATENT ATTORNEY.

United States Patent Office 2,697,569
Patented Dec. 21, 1954

2,697,569

DETACHABLE FUSELAGE AIRCRAFT

William B. Westcott, Jr., Hagerstown, Md., assignor to Fairchild Engine and Airplane Corporation, a corporation of Maryland Application January 17, 1952, Serial No. 266,925

9 Claims. (Cl. 244—118)

The present invention relates in general to aircraft having detachable or removable fuselage portions and more particularly to improved arrangements for towing, hoisting and locking one fuselage portion with respect to another.

This invention pertains to that type of aircraft in which a portion of the fuselage is detachable or separable from the main fixed fuselage which remains with the airplane and in which main fuselage is housed the pilot compartment, controls and other equipment necessary for the flight of the airplane with or without the removable portion. Typical examples of this general type aircraft are illustrated in Design Patents Nos. 157,645 and 160,563 which issued March 7 and October 17, 1950, respectively. In such aircraft the separable fuselage portion, which is generally referred to as the "pack," or the "pod," is essentially a cargo, equipment or freight container suitably shaped to complement the shape of the main fuselage which is a fixed and integral part of the aircraft. The advantages of such detachable fuselage aircraft have been recognized for some time in that a cargo can be flown, in the pack attached to the airplane, to a given location as a unit where it is quickly detached from the airplane without the necessity of the expenditure of the time and labor required to unload a conventional fuselage. At the same time it is possible for the aircraft, as soon as the detachable portion has been quickly released, to be flown away with its crew for other use without the necessity of remaining idle on the ground subjecting it to increased cost of operation as well as to the possibility of damage or capture during military operations. The present invention relates to improved means and methods for drawing or towing the respective fuselage units together and for lifting or hoisting the detachable unit into its position at which it is locked to the main aircraft fuselage.

It is accordingly a major object of the present invention to provide an improved means and method of towing and hoisting a detachable fuselage unit with respect to the airplane. A further object resides in the provision of relatively simple, efficient and easily operated towing mechanism which is capable of being readily attached to the detachable portion at an appreciable distance from the aircraft. A further object resides in the provision of a unique hydraulic-actuated strut mechanism and an improved tow-bar assembly which is automatically and readily variable in length as required during the several stages of towing and hoisting the detachable portion. A still further object of this invention resides in the improved cooperative relationship between the towing, hoisting, guiding and locking mechanisms at one end of the detachable fuselage portion and the hoisting and locking equipment provided in the top of a remote portion of the detachable fuselage portion.

Other objects and advantages of the present invention will occur to those skilled in the art after reading the following description, taken in conjunction with the accompanying drawings forming a part hereof in which:

Fig. 4 shows an adjusted relationship of the same equipment with the fuselage portions in substantially the same position as shown in Fig. 3;

Fig. 5 is a view of the same equipment in which the detachable portion has been drawn up to closely approach its final position;

Fig. 6 is a plan view of the towing and hoisting mechanism in the position shown in Figs. 1 and 2;

Fig. 7 is a detailed view of the automatic latching mechanism at the outer terminal of the tow-bar assembly;

Fig. 8 is a similar view of the same with the tow-bar tubes approaching the fully telescoped position;

Fig. 9 is a similar view with the fully telescoped tubes latched together;

Fig. 10 is a detail view of the spring-biasing device for the tow-bar latch;

Fig. 11 is a transverse sectional view of the detachable fuselage portions in the region of the rear hoisting and latching units; and Fig. 12 is a side elevational view of one of these units in the separated and final positions of the fuselage portions.

Figure 1:
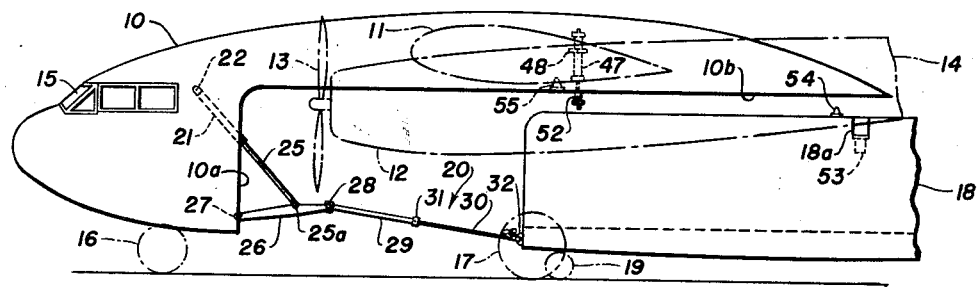
Fig. 1 is a side elevational view of a separable fuselage aircraft showing a form of the improved towing, hoisting and equipment applied thereto.

In Fig. 1, the numeral 10 indicates the fixed fuselage portion of a detachable fuselage aircraft to which the present improvements have been applied. The aircraft is provided with laterally extending wings 11 from which are supported a plurality of engine nacelles 12 driving tractor propellers 13. The aircraft is also provided with a pair of rearwardly extending booms 14, which may preferably be rearward continuations of certain of the nacelles 12, the booms supporting a high tail or empennage structure of a conventional type, not shown in the drawings. The main fuselage portion 10 is preferably provided with a conventional cockpit or pilot compartment 15, a nose wheel 16 centrally disposed beneath the forward portion of the fixed main fuselage and a pair of laterally disposed main landing wheels 17.

The main fuselage 10 of the aircraft is preferably provided with a transverse rear vertical bulkhead 10a and a horizontal plane deck portion 10b against which the roof of the detachable fuselage portion 18 is adapted to be drawn and attached to complete or to serve as a complement for the overall streamlined shape of the fuselage, that is, to provide a complete airplane having minimum drag or resistance characteristics in flight. The pack or pod 18 is preferably of the same width as the main fuselage 10, as indicated in Fig. 11, and may be provided with an upper forward rounded portion to complementarily engage the corresponding rounded portion at the intersection of the bulkheads 10a and 10b on the fixed fuselage. It will, however, be understood that the type of aircraft shown and described herein is by way of example only and the present improvements are equally applicable to other types of aircraft. The aircraft will preferably land and take-off upon the tricycle landing gear 16—17 and the pack 18 is preferably provided with four or more wheels 19, as indicated at the forward portion, for supporting and for moving the pack along the ground, while it is detached from the main fuselage.

Figure 2:
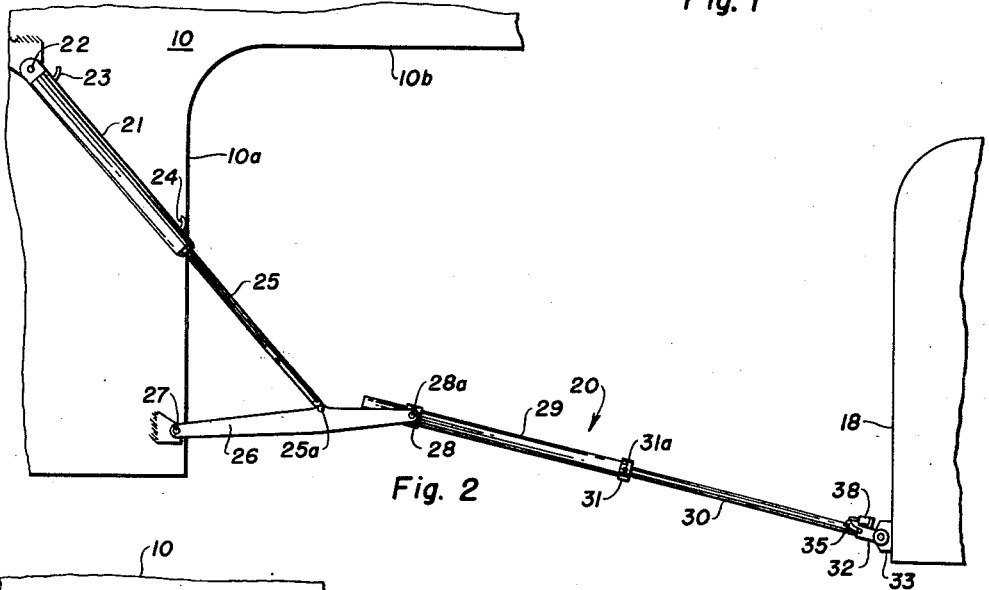
Fig. 2 is an enlarged view of the improved equipment, shown in Fig. 1, in the widely separated relationship of the fuselage portions.

Referring now more particularly to Fig. 2, and the succeeding figures, the improved hoisting and tow-bar assembly 20 is pivotally supported at and projectable through the rear bulkhead 10a of the fixed fuselage. A fluid-actuated cylinder 21 is pivotally mounted upon the pivot 22 within the fuselage, preferably along the central plane of symmetry thereof, and is provided with flexible fluid conduits 23 and 24. A piston rod element 25 has a suitable piston (not shown) attached thereto which is reciprocable within the cylinder 21 as controlled by the fluid pressure exerted through the conduits 23 and 24. The outer end of the piston rod 25 is pivotally connected at 25a to an A-frame 26, for which also see the plan in Fig. 6. The A-frame has its apex at the outer pivotal trunnion connection 28 and its base connections are pivotally mounted at 27 to the fixed fuselage adjacent the rear bulkhead 10a on each side of the longitudinal plane of symmetry.

The pivots 28a, in conjunction with the sleeve fitting 28, form a trunnion through which the tubular member 29 extends and to which it is fixed. The tubular member 29 forms a guide or casing for a second tubular or rod member 30, of somewhat lesser diameter than the member 29, within which the member 30 is adapted to slide rectilinearly or to be reciprocated. The outer or aft terminal of the tubular member 29 terminates in an end cap or collar fitting 31 which is provided with a pair of laterally extending diametrically opposed lugs 31a. The outer aft terminal of the inner tubular member 30 is provided with an attachment or end fitting 32 which is adapted to be pinned or pivotally connected to the fitting 33 near the bottom of the front end of the pack 18.

Referring now more particularly to the details shown in Figs. 7 to 10, inclusive, the aft terminal fitting 32 on the inner tube or rod 30 is suitably bifurcated to engage the tongue portion 33 of the fitting on the pack 18 and when the apertures of both fittings are aligned, a transverse pin 33a is manually inserted to pivotally connect the rod 30 to the pack 18. The rod 30 is also provided at its forward inner end with an enlarged head or terminal 34 which engages the inwardly turned flange on the fitting 31 to limit the extension of the member 30 with respect to the tubular member 29. The fitting 32, at the opposite or outer end of the rod 30, is provided with a pair of hooks 35 disposed on each side of the rod 30 and pivotally mounted thereon by means of the transverse pivot 36. The terminal fitting 32 has fixed thereto an upstanding stud or lug 37 upon which the spring-biasing assembly cylinder 38 is pivotally mounted as at 42.

The spring-biasing assembly 38 housing the compression spring 39, as more particularly shown in detail in Fig. 10, comprises a cylindrical casing pivotally mounted upon the stud 37 by the pivot 42 at one terminal and is provided with a threaded cylinder cap 38a which serves to guide the tubular piston member 40. The latter is pivotally connected by means of the pin 41 to the hooks 35 and at its opposite terminal is provided with an enlarged diameter portion adapted to guidingly slide within the cylinder 38. This sliding occurs either under the influence of the compression spring 39, or when the hooks are cammed back by engagement with the pins 31a, to overcome the compression of the spring 39 to permit clockwise swinging of the hooks. The hooks 35 may also be manually disengaged from the pins 31a at the outer end of the tubular member 29 when it is desired to extend the towing mechanism to reach the pack at an appreciable distance aft of the bulkhead 10a. It will be understood that as the tubular member 29 is moved toward the right in Fig. 7, that is, externally along the rod 30, the pins 31a engage the rounded outer nose portions of the hooks 35, camming the latter upwardly or counterclockwise around the pivot 36, against the opposition of the spring 39, passing beneath the points of the hooks as shown in Fig. 8, beyond which the hooks are rotated in the opposite or in the counterclockwise direction under the influence of the spring 39 to positively engage the pins 31a and member 29 locks itself against extension, as shown in Fig. 9. The fluid linear actuator 21 as shown in Fig. 6 is controlled by means of a distributing valve 43 provided with a suitable handle 44 for selecting the direction of the fluid flowing from the fluid pressure line 45 to either one of the conduits 23 or 24, from the other of which the return fluid is directed through the valve 43 into the return line 46.

As indicated in Fig. 1, and more particularly shown in Figs. 11 and 12, a pair of attachment and hoisting units 47 is provided toward the aft end of the pack 18 adjacent each of its sides, with the fixed portions of these units mounted adjacent the sides of the fixed fuselage 10 close to the wing structure 11 as it passes through the fixed fuselage. The units 47 are preferably identical with each other and consist of a hydraulic linear actuator or cylinder mounted upon a universal gimbal or ring support 48 to permit its rocking in any direction within reasonable angular limits. Each cylinder 47 has reciprocable therewithin a piston and piston rod assembly 49 which is extensible or retractable under the influence of hydraulic pressure exerted through the flexible conduits 50 and 51. To the lower end of the piston rod 49, there is attached a flexible connection or suitable universal joint 52 terminating in a conventional glider tow release or other suitable type releasable fitting engageable with the socket or housing portion 53 which is fixedly attached to the structure of the pack 18. It will be understood that both units 47 are identical, the one at the left in Fig. 11 being compacted to approximately the fully lifted position of the pack 18 and the unit 47 to the right in Fig. 11 being shown extended to its lower limit to reach the pack while the latter is still resting on the ground upon its own wheels 19.

The housing fittings 53 are located at the bottom of the recesses 18a provided at the upper edges of the pack 18 and the flexible ring mounting 48 of each unit permits swinging of the unit either laterally or in the fore and aft direction as indicated in Fig. 12 to accommodate reasonable misalignment in positioning of the pack with respect to the airplane prior to the units being drawn together. One or more suitable guide fittings 54 may be attached to the top of the pack 18 for nesting in a mating socket fitting 55 in the lower surface 10b of the fixed fuselage to assist in the guiding and alignment of the pack with respect to the airplane. Preferably both of the units 47 are simultaneously controlled for lifting and lowering in unison and due to the universal mountings, the pack will automatically center itself as the hoisting units 47 lift the pack off the ground and it becomes suspended from these units. Each of the hydraulic fluid actuators 47 is preferably of the automatic hydraulic locking type in order to lock the pack to the airplane in the fully hoisted position.

The operation of the towing, hoisting and latching equipment is as follows: With the airplane 10 and the pack 18 in the approximate positions shown in Fig. 1, the distributing valve 43 is moved such that the fluid pressure enters the actuating cylinder 21 through the flexible conduit 23 and the piston element 25 is fully extended to the position shown in Fig. 2 in which the A-frame is rotated downwardly about its pivotal mounting 27 to a substantially horizontal rearwardly directed position and from which the extended tubular member 29 and the rod 30 extend downwardly and rearwardly for attachment to the fitting 33 of the pack 18. In the event the rod 30 had been telescoped within the tubular member 29 the operator would release the latches or hooks 35 manually and draw the rod 30 rearwardly to the pack 18 at which the rod 30 is manually pinned to the pack fitting 33. The mechanism is then in the relationship shown in Fig. 2.

Figure 3:
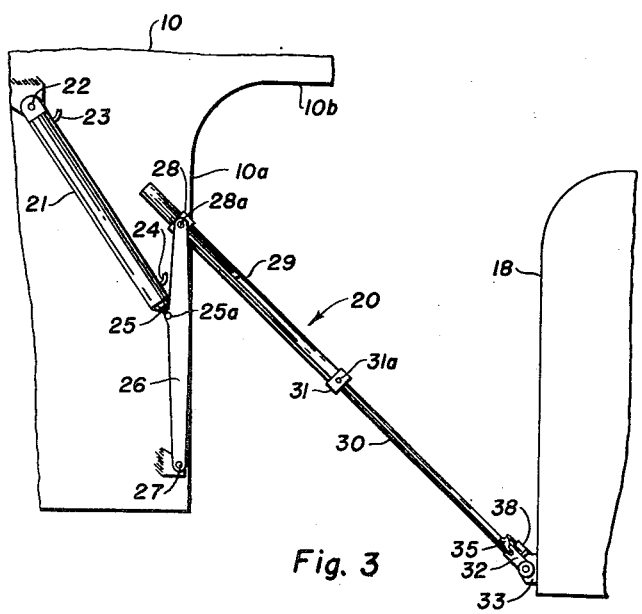
Fig. 3 is a similar view of the same equipment in a more closely positioned relationship of the fuselage portions.

The control valve 43 for the hydraulic actuator 21 is then rotated to the position at which the fluid pressure enters the conduit 24 and the piston-cylinder combination 21—25 is compacted and the A-frame is drawn upwardly and inwardly about its pivotal mountings 27 to the position shown in Fig. 3. As this occurs, the rearwardly extended tow-bar assembly 20, comprising the elements 29 and 30 and their mountings and terminal fittings, tows the pack forwardly to the position shown in Fig. 3. The control valve 43 is reversed such that the piston 25 is extended downwardly and rearwardly together with the A-frame 26, which through the trunnion fitting 28, causes the tubular member 29 to be slid down over the rod 30 to the extreme position at which the pins 31 are automatically engaged by the latch hooks 35, as shown in detail in Fig. 9, and at which the mechanism is shown in the relationship indicated in Fig. 4, the pack not having been moved during this take-up or shortening phase of the operation. The control valve 43 is then again reversed such that the piston rod 25 is drawn upwardly and forwardly within the cylinder 21 of the actuator, causing the A-frame 26 and the latched telescoped elements 29 and 30 to fold into a substantially aligned position with respect to each other while pulling the pack 18 forwardly and lifting the same upwardly to the position shown in Fig. 5. The lower forward end of the pack 18 which has now reached the position shown in Fig. 5, in which the pack is still supported upon its rear wheels in a position slightly aft of its final longitudinal position with respect to the airplane.

After the towing and hoisting operation described above has been completed and engagement of the fittings 52 and 53 have been made to the aft portion of the pack 18 at each side of the latter, the fluid actuators 47 are suitably operated such that they hoist the pack from the approximate position shown in the lower broken lines in Fig. 12, to the final position shown in the upper set of broken lines in this same figure. As the pack is lifted at its rear portion by the hydraulic hoisting units 47, the pack is moved forwardly and upwardly into a closely abutting relationship with both the rear bulkhead 10a and the horizontal undersurface 10b of the fixed fuselage, at which position the pack is hydraulically locked to the fuselage by the hydraulic actuators 21 and 47, which hydraulic locks may be supplemented with other suitable mechanical type locks where found desirable. Obviously other types of extensible struts, such as electric-motor or mechanically driven screw jacks, may be substituted for the hydraulic actuators 21 and 47. It will be understood that the pack can then be flown with the airplane as a fixed component thereof to a suitable site at which the pack or its contents are to be delivered or deposited. After the airplane has landed upon its own landing gear 16—17 and has taxied to the position at which it is desired to deposit the pack, the reverse of the foregoing operation is then followed, namely, in that the rear units 47 are initially operated to lower the pack until it is self-supported at its aft portion by its rear wheels, after which the front portion is lowered by extension of the actuating cylinder 21 until the forward portion of the pack is supported upon its front wheels. Following which the fittings 32 and 52 may be disconnected from the pack fittings 33 and 53, respectively, and the airplane moved forwardly or the pack towed, pushed or otherwise drawn rearwardly to separate the units.

Other forms and modifications of the present invention, both with respect to its general arrangement and the details of its several component parts, which may become obvious to those skilled in the art, are intended to come within the scope and spirit of this invention, as more particularly set forth in the appended claims.

I claim:

1. An aircraft, said aircraft having a detachable fuselage portion, mechanism for moving said detachable portion longitudinally and vertically for aligned contact with said aircraft including a frame member pivotally mounted at a base portion upon said aircraft, a linear motor pivotally mounted upon the aircraft above said frame member pivotal mounting, said motor pivotally connected to said frame member and means including a pair of telescopic struts for connecting a further portion of said frame member opposite said base portion to said detachable fuselage portion.

2. An aircraft, said aircraft having a fixed fuselage portion, a detachable fuselage portion, a frame having a terminal pivotally mounted upon a lower portion of said fixed fuselage portion, said frame having a pivotally mounted terminal and a free terminal, a fluid-actuated cylinder pivotally mounted upon said fixed fuselage portion at a position disposed above the said pivotal mounting of said frame, said fluid cylinder having an extensible portion connected to said frame intermediate its pivotally mounted terminal and its free terminal and means including a pair of telescoping elements, a first of said telescoping elements connected to the free terminal of said frame and the second of said telescoping elements connected to said detachable fuselage portion whereby contraction of said fluid cylinder and rotation of said pivotally mounted frame imparts towing movement to said detachable fuselage portion toward said fixed fuselage portion.

3. In a towing arrangement for an aircraft having a fixed fuselage and a detachable fuselage portion, a frame member having a base portion pivotally mounted upon a lower portion of said fixed fuselage, a linear motor pivotally mounted upon said fixed fuselage at a position disposed above said pivotal mounting of said frame member, said linear motor having an extensible portion pivotally connected to said frame member, and means including a pair of telescoping elements, a first of said telescoping elements pivotally connected to said frame member, the second of said telescoping elements connected to a forward portion of said detachable fuselage portion.

4. In an aircraft, a fixed fuselage portion, a detachable fuselage portion, a frame element pivotally mounted upon said fixed fuselage portion, a fluid-actuated motor pivotally mounted upon said fixed fuselage portion at a position spaced from the said pivotal mounting of said frame, said fluid motor having an extensible portion pivotally connected to said frame, means including a pair of telescoping elements, a first of said telescoping elements connected to said frame and the second of said telescoping elements connected to said detachable fuselage portion whereby contraction of said fluid motor and rotation of said pivotally mounted frame imparts movement to said detachable fuselage portion toward said fixed fuselage portion, means cooperatively carried by each of said telescoping elements for latching said pair of telescoping elements together in a shortened condition whereby further contraction of said fluid motor imparts a secondary movement to said detachable fuselage portion.

5. In an aircraft, a fixed fuselage, a detachable fuselage portion, a frame element pivotally mounted at a first terminal upon a lower portion of said fixed fuselage, a fluid-actuated motor pivotally mounted upon said fixed fuselage at a position disposed above the said pivotal mounting of said frame element, said fluid motor having an extensible portion connected to said frame element intermediate its pivotally mounted terminal and its free terminal, means including a pair of telescoping elements, a first of said telescoping elements pivotally connected to said free terminal of said frame element and a second of said telescoping elements connected to a forward portion of said detachable fuselage portion whereby contraction of said fluid motor causes rotation of said pivotally mounted frame element and imparts towing movement of said detachable fuselage portion toward said airplane, means for latching together said pair of telescoping elements in their telescoped and shortened condition whereby further contracting of said fluid cylinder imparts a lifting component and a secondary towing movement to said detachable fuselage portion.

6. An aircraft, said aircraft having a detachable fuselage portion, mechanism for moving said detachable fuselage portion longitudinally and vertically for contact with said aircraft including a member pivotally mounted at one terminal upon said aircraft, said member having a free terminal, a fluid-actuated motor pivotally mounted upon the aircraft and pivotally connected to said member, and means for connecting the said free terminal of said member to said detachable fuselage portion.

7. An aircraft, said aircraft having a detachable fuselage portion, a member rotatably mounted upon said aircraft at a lower terminal, said member comprising an A-frame with said rotatable mounting at its base portion, said frame member having an apex portion rotatable about said rotatably mounted base portion, an elongated pulling member mounted upon the apex portion of said frame member, said elongated pulling member arranged for connection to said detachable fuselage portion, and power-actuated means connecting said aircraft with said frame member for rotating said frame member about said rotatably mounted base portion arranged in such manner that as said frame member is rotated from an inclined position of said elongated pulling member connected to said detachable fuselage portion toward a vertical position of said elongated pulling member by said power-actuated means said detachable fuselage portion is drawn longitudinally toward said rotatably mounted base portion and vertically upward toward said rotatably mounted base portion.

8. An aircraft, said aircraft having a detachable fuselage portion, said fuselage portion having ground engaging means, mechanism for moving said detachable fuselage portion longitudinally along said ground engaging means and vertically off said ground engaging means for engagement with a main portion of said aircraft, said mechanism including a member operatively supported at a base terminal upon said aircraft, said member having an opposite terminal swingable about said base terminal, a power-actuated strut operatively connected to the aircraft and to a portion of said member intermediate said terminals, and variable length means for connecting the said swingable terminal of said member to said detachable fuselage portion for moving said portion longitudinally and vertically into engagement with said aircraft.

9. In an aircraft having a fixed fuselage portion and a complementary detachable fuselage portion, said detachable fuselage portion having ground engaging means, mechanism for moving said detachable fuselage portion longitudinally along said ground engaging means and vertically from said ground engaging means for engagement with said fixed fuselage portion, said mechanism including a frame member operatively supported at a first terminal upon said fixed fuselage portion, said frame member having a second terminal swingable about said first terminal, a power-actuated member operatively connected to the fixed fuselage portion and to an intermediate portion of said frame member, means including a variable length strut operatively connected to said frame member at a point spaced from said operatively supported first terminal, said variable length means provided at one of its terminals with a fitting for attachment to said detachable fuselage portion, said variable length means provided with a latch device for fixing the length of said variable length means whereby power applied to said strut imparts longitudinal and vertical movements to said detachable fuselage portion through said frame member and said variable length means, and means associated with said power-actuated strut for locking said mechanism and said detachable fuselage portion in its engaged position to said fixed fuselage portion.

References Cited in the file of this patent

UNITED STATES PATENTS

| Number | Name | Date |
|---|---|---|
| 2,323,279 | Van Zelm | June 29, 1943 |
| 2,447,665 | Protzeller | Aug. 24, 1948 |
| 2,448,862 | Conklin | Sept. 7, 1948 |

FOREIGN PATENTS

| Number | Country | Date |
|---|---|---|
| 636,536 | Great Britain | May 3, 1950 |
| 886,022 | France | June 15, 1943 |
| 918,871 | France | Nov. 12, 1946 |